United States Patent
Reichert

(10) Patent No.: US 7,080,513 B2
(45) Date of Patent: Jul. 25, 2006

(54) SEAL ELEMENT FOR SEALING A GAP AND COMBUSTION TURBINE HAVING A SEAL ELEMENT

(75) Inventor: Arnd Reichert, Duisburg (DE)

(73) Assignee: Siemens Aktiengesellschaft, Munich (DE)

( * ) Notice: Subject to any disclaimer, the term of this patent is extended or adjusted under 35 U.S.C. 154(b) by 42 days.

(21) Appl. No.: 10/767,835

(22) Filed: Jan. 29, 2004

(65) Prior Publication Data

US 2005/0076642 A1    Apr. 14, 2005

Related U.S. Application Data

(63) Continuation of application No. PCT/EP02/08257, filed on Jul. 24, 2002.

(30) Foreign Application Priority Data

Aug. 4, 2001    (GB) ................................. 0119098.2

(51) Int. Cl.
*F02C 1/00*    (2006.01)
*F02G 3/00*    (2006.01)

(52) U.S. Cl. ............................ 60/722; 60/799; 277/628

(58) Field of Classification Search ................... 60/770, 60/722, 799, 800; 277/628, 631, 626, 608, 277/644, 647, 460, 630, 465, 485, 477, 614, 277/641, 597, 931

See application file for complete search history.

(56) References Cited

U.S. PATENT DOCUMENTS

| | | | |
|---|---|---|---|
| 2,991,045 A | 7/1961 | Tassoni | |
| 3,341,172 A | 9/1967 | Rahaim | |
| 3,750,398 A * | 8/1973 | Adelizzi et al. | ........... 60/39.37 |
| 4,121,843 A * | 10/1978 | Halling | ......................... 277/647 |
| 4,537,024 A | 8/1985 | Grosjean | |
| 4,602,795 A * | 7/1986 | Lillibridge | ................... 277/644 |
| 4,759,555 A * | 7/1988 | Halling | ......................... 277/631 |
| 5,249,814 A * | 10/1993 | Halling | ......................... 277/654 |
| 5,265,412 A * | 11/1993 | Bagepalli et al. | .............. 60/800 |
| 5,363,643 A * | 11/1994 | Halila | ......................... 60/796 |
| 5,586,773 A | 12/1996 | Bagepalli et al. | |
| 5,630,593 A * | 5/1997 | Swensen et al. | ............. 277/626 |
| 5,657,998 A | 8/1997 | Dinc et al. | |
| 5,669,612 A * | 9/1997 | Nicholson | .................... 277/614 |
| 5,716,052 A * | 2/1998 | Swensen et al. | ............ 277/647 |
| 5,975,844 A | 11/1999 | Milazar et al. | |
| 6,120,037 A * | 9/2000 | Schmertz | ..................... 277/647 |
| 6,199,871 B1 | 3/2001 | Lampes | |
| 6,227,546 B1 * | 5/2001 | Halling | ......................... 277/312 |

(Continued)

FOREIGN PATENT DOCUMENTS

EP    0 545 589 A1    6/1993

(Continued)

*Primary Examiner*—William Rodriguez

(57) ABSTRACT

The invention pertains to a seal element for sealing a gap, in particular within a turbo-machinery, between a first component and a second components spaced apart from each other, said first component having a first surface and said second component having an opposing second surfaces. The seal element comprises a support structure and a sealing structure covering at least partially said support structure. The support structure comprises at least two contacting members, each contacting member serves for putting a portion of the sealing structure in contact with one of the surfaces and being capable of following a deformation of said surface. The invention further pertains to a combustion turbine, wherein a gap is formed between a first surface and a second surface, which gap is sealed off by said seal element.

24 Claims, 5 Drawing Sheets

U.S. PATENT DOCUMENTS

| | | |
|---|---|---|
| 6,237,921 B1 | 5/2001 | Liotta et al. |
| 6,257,594 B1 * | 7/2001 | Halling et al. .............. 277/644 |
| 6,299,178 B1 * | 10/2001 | Halling ....................... 277/654 |
| 6,325,392 B1 * | 12/2001 | Halling ....................... 277/654 |
| 6,446,978 B1 * | 9/2002 | Halling et al. .............. 277/626 |
| 6,450,762 B1 * | 9/2002 | Munshi ....................... 415/138 |
| 6,568,692 B1 * | 5/2003 | Kolodziej et al. .......... 277/614 |
| 6,588,761 B1 * | 7/2003 | Halling ....................... 277/312 |
| 6,626,440 B1 * | 9/2003 | Halling ....................... 277/626 |
| 6,648,333 B1 * | 11/2003 | Aksit et al. ................. 277/316 |
| 6,659,472 B1 * | 12/2003 | Aksit et al. ................. 277/647 |
| 6,752,592 B1 * | 6/2004 | Mohammed-Fakir et al. .... 415/139 |

FOREIGN PATENT DOCUMENTS

| | | |
|---|---|---|
| GB | 2 292 981 A | 3/1996 |
| WO | WO 98/53228 | 11/1998 |
| WO | WO 00/10920 | 3/2000 |
| WO | WO 00/70192 | 11/2000 |

* cited by examiner

SEAL ELEMENT FOR SEALING A GAP AND COMBUSTION TURBINE HAVING A SEAL ELEMENT

CROSS REFERENCE TO RELATED APPLICATIONS

This application is a continuation of International Application No. PCT/EP02/08257, filed Jul. 24, 2002 and claims the benefit thereof. The International Application claims the benefit of British application No. 0119098.2 filed Aug. 4, 2001, Both of these prior applications are incorporated by reference herein in their entireties.

FIELD OF THE INVENTION

The invention relates to a seal element for sealing a gap which may be formed between spaced-apart first and second components, in particular of a turbo machinery like a combustion turbine. The invention also relates to a combustion turbine having a seal element.

BACKGROUND OF THE INVENTION

In industrial plants, particularly thermo-mechanical machines and chemical plants, in which different fluids are used, it may be necessary to keep those fluids separate from one another within the plants. For example, in thermal combustion power plants, flow regions of hot combustion gases have to be separated sealingly from flow regions of cooling gases of lower temperature. In gas turbine plants with high turbine inlet temperatures, for example of more than 1000° C., thermal expansions of the individual components of the gas turbine plant occur, so that adjacent components are sometimes spaced from one another through the use of a gap in order to avoid high thermal stresses and the formation of cracks. Such gaps may constitute connections between flow regions of hot gases and flow regions of cold gases. It is advantageous to seal off the gap to reduce the inflow of cold gas into the flow region of hot gases so as not to thereby lower the temperature in the flow region of hot gases.

U.S. Pat. No. 3,341,172 and U.S. Pat. No. 2,991,045, each of which describes a gas turbine with an outer casing and a two-part inner casing, accordingly specify a sealing element that has a cross-section in the shape of an elongate C for sealing a gap between the two inner casings. An annular gap, through which cooling fluid is guided, is formed between the inner casing and the outer casing. The hot gas for driving the gas turbine flows within the inner casing.

U.S. Pat. No. 4,537,024 describes a gas turbine plant, in which components of a nozzle structure are sealed through the use of axial and radial sealing elements. The sealing elements are intended to prevent hot gas which flows through the nozzle structure from infiltrating into turbine regions outside the hot-gas duct. A sealing element can have approximately the shape of a squashed eight as seen in cross-section.

U.S. Pat. No. 5,975,844 describes in an assembly including two mutually thermally movable components each having a component groove located one opposite the other, a sealing element. This sealing element is directed along a main line for sealing a gap between the components. It comprises a first end, a second end opposite the first end and a middle region, in a cross-section substantially perpendicular to the main line, along a centre line, whereby the middle region is disposed between the ends and the sealing element having a toothed first surface.

U.S. Pat. No. 5,657,998 relates to a gas-path leakage seal for generally sealing a gas-path leakage-gap between spaced-apart first and second members of a gas turbine, in particular first and second segments of a gas turbine combustor casing. This seal comprises a generally imperforate foil-layer assemblage consisting essentially of materials selected from the group consisting of metals, ceramics, and polymers. This foil-layer is impervious to gas and it is disposed in the gas-part leakage-gap. The foil-layer assemblage having a first foil-layer with a lengthwise direction. The gas leakage seal further comprises a cloth-layer assemblage covering and contacting generally the entire first foil-assemblage outer surface and consisting essential of materials selected from the group consisting of metals, ceramics and polymers. Preferably the cloth-layer assemblage has two layers each have a thickness of about 10–25 microns. The cloth-layers each are woven cloth-layers and each comprises a high temperature, nickel-based superalloy, such as Inconel X-750. The seal assemblage is either fixed in grooves of adjacent parts of a gas turbine, or introduced in a U-shape flange of a combustor, or used in a twin-seal installation or in a multi-seal installation. In either case the seal fully lies within the leakage-gap, and provides a sealing effect either by contacting a surface within the gap, being inserted in a groove or contacts another seal assemblage. In comparison to a conventional metal rigid seal this seal with two foil-assemblages reduces the gas-path leakage from 2.4% to generally 1.0% according to U.S. Pat. No. 5,657,998.

SUMMARY OF THE INVENTION

It is an object of the invention to provide a seal element for sealing a gap, in particular a gas-path leakage gap of a turbo machinery like a combustion turbine. It is a further object of the invention to provide a combustion turbine with a seal element.

With the forgoing and other objects in view there is provided in accordance with the invention, a seal element for sealing a gap between a first component having a first surface and a second component having a second surface and being spaced apart from the first component. The seal element comprises a support structure and a sealing structure covering at least partially the support structure. The support structure comprises at least two contacting members, whereby each contacting member serves for putting a portion of the sealing structure in contact with one of the surfaces and being capable of following a deformation and/or movement of said surface.

The invention takes into consideration the perception that in an apparatus having parts being exposed to different temperatures different thermal expansions and deformations occur. For example in furnaces or more general hot gas chambers, as in a gas turbine, those parts being exposed to a hot gas during the stationary operation conditions of the apparatus are exposed to higher temperatures than those parts, in particular wall components, not directly exposed to the hot gas. The resulting different thermal expansions of the parts are compensated by gaps left between parts for freely expanding. In combustion turbines for example it is often necessary to hinder the hot gas to flow through the gap, as parts behind the gap may not be capable to withstand the high temperature of the hot gas. Therefore cooling fluid under a higher pressure than the hot gas is fed to the gap. A portion of this cooling gas than flows as leakage-gas through the gap into a stream of the hot gas thereby hindering the hot gas to flow into the gap. In a gas turbine this high pressure cooling gas is taken from the compressor of the gas turbine and due to the leakage through the gap can not be used for the combustion process which reduces the efficiency of the gas turbine. To reduce the amount of leakage gas seal elements are provided for sealing the gap. Design and manufacture of suitable seal elements becomes the more difficult the more curved the shape of the gap is, the higher a lateral movement of the gap is and the higher the temperature of those surface which are in contact with the seal element become. A even more complicated situation arises when those surface become permanently uneven, in particular due to relaxation processes or inelastic deformations.

With the seal element according to the invention the contacting members cope with those deformations and movements of the first and second components, while the sealing structure still contacts the surface and so preventing cooling fluid from flowing between sealing structure and surfaces. By choosing suitable materials for the support structure and the sealing structure respectively the seal element can be used for temperatures of over 500° C. and up to over 1300° C. Unlike other seals as one-piece metallic seals or metallic brush seals, which are capable to cover only a certain movement of the gap or are quite expensive, need a rather large space and can only be used for slightly curved surfaces the seal element according to the invention is simple to manufacture, cost efficient, capable to cope with curved surfaces as well as steps in the surfaces and is able to follow movements and deformations of the gap or the surfaces.

According to the invention the sealing function performed by the sealing structure is separated from the ability of elastic deformation performed by the support structure. By use of at least two contacting members the seal element is less stiff then a one-piece metallic seal wherein the metallic structure also fulfils the sealing function. As preferably each contacting member has the ability for deformation and movement independently from the others a sealing of large deformed or uneven surfaces is possible. This also includes surfaces having steps, which can occur in attached segments of a gas turbine, like blades, vanes, heat shield elements of a combustion chamber.

In accordance with another feature of the seal element the sealing structure comprises a web having metallic and/or ceramic fibres. By virtue of the web of ceramic or metallic fibres which form a flexible and deformable sealing portion a good sealing performance can be assured. Ceramic fibres as well as certain metallic fibres can be used up to temperatures of about 1200° C. or even more. The seal element is therefore useable for sealing components of a turbo machinery, furnaces, burners or the like, which are exposed to hot gases. Depending on the mesh-size of the web the sleeving and therefore the seal-element is gas pervious, so to some extend the cooling gas may flow through the sleeving thereby cooling the fibres. This leads to an effusion cooling of the seal element Also regions and turbine parts in the vicinity of the gap outside of the cooling gas region can be cooled by the cooling gas penetrating the sealing structure.

In accordance with a further feature the sealing structure comprises a ceramic fibre fabric, a ceramic fibre tape, a ceramic fibre sleeving or a ceramic fibre mat. Preferably the ceramic fibres essentially consisting of a material like Zirconia ($ZrO_2$), Silica ($SiO_2$) or Alumina ($Al_2O_3$). It is understood that those ceramic materials could be combined and also be stabilised by other materials like Yttria ($Y_2O_3$). For example the ceramic fibres may essentially consist of (in weight %) of 62.5% $Al_2O_3$, 24.5% $SiO_2$, 13% $B_2O_3$ with a crystal phase of Mullite-type and amorphous or solely amorphous; of 70% $Al_2O_3$, 28% $SiO_2$, 2% $B_2O_3$ with $\gamma$-$Al_2O_3$, Mullite and amorphous $SiO_2$; of 73% $Al_2O_3$, 27% $SiO_2$ with $\gamma$-$Al_2O_3$ and amorphous $SiO_2$, of 89% $Al_2O_3$, 10% $ZrO_2$, 1% $Y_2O_3$ with $\alpha$-$Al_2O_3$ and Yttria stabilised Zirconia; of 85% $Al_2O_3$ and 15% $SiO_2$ with $\alpha$-$Al_2O_3$ and Mullite; of >99% $Al_2O_3$ as $\alpha$-$Al_2O_3$. Such ceramic fibre materials are for example available from 3M (Minnesota Mining and Manufacturing Company), St. Paul, Minn., USA under the Trademark of "Nextel". The manufacturing of ceramic fibres as well as the manufacturing of a web comprising ceramic fibres are know to those skilled in the art. Therefore a suitable web comprising ceramic fibres fulfilling specified properties, in particular heat resistance up to over 1200° C. to about 1372° C., flexibility and other mechanical features may be chosen by those skilled in the art to provide a sealing structure bounded to or just covering the support structure. Other features like porosity and decree of gas perviousity can be provided in a predefined range.

In accordance with an added feature the sealing structure comprises a metallic fibre fibric, a metallic fibre tape, a metallic fibre sleeving or a metallic fibre mat. As metallic fibres are quite ductile and not brittle they are as well elastically as plastically deformable and form a web which resists high thermal and mechanical loads. Preferably the metallic fibres consist of a superalloy, in particular a nickel-based, a cobalt-based or iron-based superalloy In accordance with an additional feature the sealing structure is loosely connected to the support structure. The sealing structure preferably itself is an object manufactured separately from the support structure. It is put in contact with the support structure for covering at least a portion of the support structure after its own manufacturing. So it preferably provides a loose contact with the support structure and is removable from the support structure. In the latter case it could easily be replaced during maintenance of a turbo machinery by a new web. In an embodiment in which the sealing structure is provided as a sleeving the support structure is introduced into the sleeving and so all surfaces of the support structure are surrounded by the web of fibres. It is also possible to provide a ceramic fibre sealing structure, for example a layer, tightly bounded to the support structure.

In accordance with yet another feature the support structure consists of a metal, in particular a sheet metal. Having a support structure of a metal allows a simple manufacturing of the contacting members, for example by simply cutting slits into the metal. Suitable metals are those who withstand high temperatures, for example high temperature steels like chromium steels or high temperature alloys on the basis of nickel or cobalt. The metal piece may extend along a centre line, whereby slits and/or recesses parallel and or perpendicular to the centre line lead to independently deformable contacting members, in particular vat-like contacting members. Such a piece of metal may also be bent or curved along the centre line and around the centre line, so that either a cylindrical shape or ring shape can be easily achieved. Having a support structure with slits and/or recesses reduces the stiffness. So compared to a more stiff structure larger deformations can be carried out under the same internal stress applied In accordance with yet a further feature the support structure has a curved form, in particular is U-shaped, open-ring shaped or ring-shaped. A curved support structure can be pre-stressed when put into contact with the surfaces, so that deformations of the surfaces which compress the support structure or give the support structure the opportunity to expand will coped by the contacting members without losing contact with the surfaces.

In accordance with yet an added feature the support structure has a frame portion to which said contacting members are connected via a branch portion extending away from said frame portion The contacting members may have a vat-like form. Having a branch portion to which the contacting member is connected assures for the contacting member the ability to deform and move in a three-dimensional way. The branch portion and the contacting member may in addition be twisted and bent.

The branch portions may form together with a middle portion a two-arm spring. In such a spring each branch portion forms one arm of the spring, whereby in the middle portion the spring may be bent to form one or more loops. With the middle portion the spring may be connected to the frame portion, which frame portion may have a suitable opening, hook or the like. The spring may be made of any suitable wire, preferably metallic wire, whereby the contacting members may be formed a bend wire portions. Preferably the branch portion and the contacting member are elastically deferrable.

In accordance with yet an additional feature the support structure has at least two branch portion with different length. Having branch portions with different length is in particular useful when surfaces with steps, grooves, recesses or ridges have to be sealed.

In accordance with a concomitant feature the seal element comprises a tightening member for tightening said sealing structure between two adjacent contacting members. Preferably the tightening member comprises a spring member, in particular a spring ring. Applying a tightening member for tightening the sealing structure insures that the sealing structure is in close contact with the surfaces so that during different operating conditions, different temperatures and during a long period of time the seal element assures a good sealing effect. In particular in a seal element with a support structure surrounded by a sleeking, this sleeking may form a pleat which will be smoothened by a tension created by the tightening member. The tightening member may be permanently connected to the seal element, in particular to the sealing structure or it may be removable connected to the seal element. So the seal element may comprise two or three distinct parts (sealing structure, support structure, tightening member) which fulfil different tasks and which can be separated from each other, in particular replaced by other compatible parts in case of repair, maintenance or renewal.

In accordance with again another feature the seal element is placed in a hot gas chamber for sealing a gap. The hot gas chamber has a hot-gas flow region surrounded by a wall structure, which comprises the second component with the second surface. A first component being attached to the wall structure and having the first surface, which is directed to the wall structure. The gap is formed between the first component and the second component, in particular between the first surface and the second surface. The sealing structure is in contact with the second surface of the second component and with the first surface of the first component thereby sealing the gap. Preferably the hot gas chamber is a part of a combustion turbine, in particular is a combustion chamber or a turbine section. The combustion chamber may be one of a jet engine, a turbine of an automotive or a submarine or the like. It may also be the combustion chamber of a stationary gas turbine in particular one for producing electrical power. The combustion chamber may be a ring chamber or a can-like chamber, whereby in a gas turbine two or more can-like combustion chambers may be used. In a combustion turbine having a number of burners, with each burner connected to a turbine section by a separate duct or can, a seal element as described above may serve to seal a turbine inlet for hot gas to enter the turbine section and a respective duct (can) ending in the vicinity of the turbine inlet for allowing hot gas to flow from the burner to the turbine inlet.

In accordance with again a further feature the seal element seals a gap, wherein the first component is a heat shield element of a combustion chamber or a shroud element of a turbine section. In a ring combustion chamber a metallic heat shield may be multiply curved, so that the seal element with contacting members following the shape and the deformation of the surfaces of the heat shield is most efficient. In a can-like combustion chamber the seal element is preferably used to seal the region between can and entrance into the turbine section. It may also be used for sealing a gap between metallic heat shield elements with a closed loop cooling fluid circuit and a wall structure.

The seal element may also be used to seal off a gap between components which are not spaced apart in radial direction of a gas turbine but disposed in axial and circumferential direction, wherein at least first and second of the components are spaced apart in the circumferential direction or in the axial direction by a leakage-gap. Those components have an inner surfaces exposed to the hot gas region and an outer surfaces exposed to the cooling gas region. The seal element can be used to seal either a gap between first and second components in the axial direction or between first and second components in the circumferential direction.

In accordance with another object of the invention it is provided a combustion turbine having a gas-leakage gap which is seal by a seal element. The combustion turbine comprises a hot gas chamber having a hot-gas flow region, a wall structure surrounding the hot-gas flow region and comprising at least one second component having a second surface directed to the hot-gas flow region. At least one first component is attached to the wall structure and has a first surface, which is directed to the wall structure. The gap is formed between the first component and the second component, in particular between the first surface and the second surface. The seal element for sealing the gap comprises a support structure and a sealing structure covering at least partially the support structure. The support structure comprises at least two contacting members, each of which puts a portion of the sealing structure in contact with one of the surfaces and being capable of following a deformation of the respective surface. The sealing structure further being in contact with said second surface of the second component and with the first surface of the first component thereby sealing the gap.

In accordance with yet another object of the invention it is provided a combustion turbine having a gap between a duct and a turbine inlet, which gap is seal by a seal element. The turbine inlet is an opening which allows hot gas to enter a turbine section of the combustion turbine. The duct connects a combustion chamber of a burner, in which the hot gas is generated to the turbine inlet.

All of the advantages and features of the seal element described in more detail above also hold for the combustion turbine having this seal element, in particular the features and advantages with respect to the seal element comprising a curved frame portion from which the contacting members are spaced apart and whereby each contacting member being connected to the frame portion via a branch portion. Preferably the seal element is surrounded by the sealing structure being a sleeving.

Although the invention is illustrated and described herein as embodied in a seal element for sealing a gap and a combustion turbine, it is nevertheless not intended to be limited to the details shown, since various modifications and structural changes may be made therein without departing from the spirit of the invention and within the scope and range of equivalents of the claims.

The construction of the seal element and the turbine of the invention, however, together with additional objects and advantages thereof will be best understood from the following description of specific embodiments when read in connection with the accompanying drawings.

DESCRIPTION OF THE PREFERRED EMBODIMENTS

Figure 1:
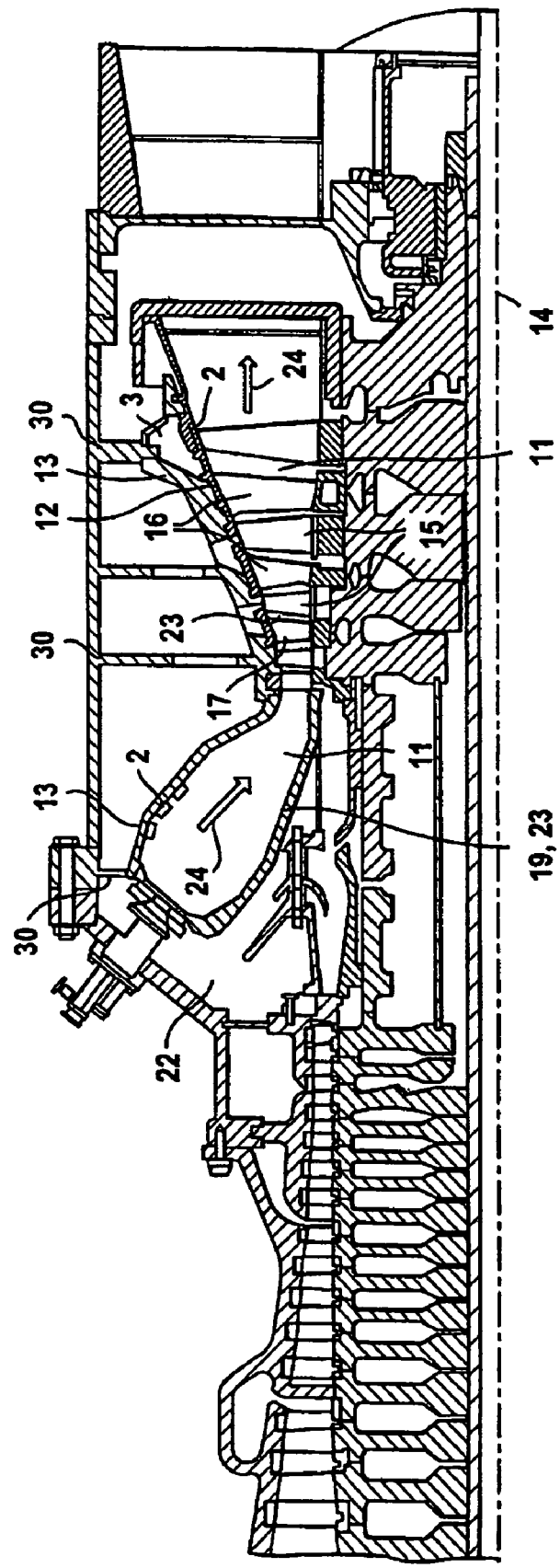
FIG. 1 is a fragmentary, diagrammatic, longitudinal-sectional view of a combustion turbine.

Referring now to the figures of the drawings in detail and first, particularly, to FIG. 1 thereof, there is shown a in a cross-sectional view an upper portion of a combustion turbine (in the following also called gas turbine) 22 directed along a main axis 14. The gas turbine 22 has along said main axis 14 a compressor (not further specified), a combustion chamber 19 and a turbine section 17. Both combustion chamber 19 and turbine section 17 form a hot gas chamber 23 through which hot gas 24 generated in the combustion chamber 19 by burning air and fuel flows. In the turbine section 17 guide blades 16 and moving blades 15 are arranged in an alternating order along the main axis 14. The guide blades or vanes 16 are directed perpendicular to the main axis 14 and are disposed along the circumference of the gas turbine 22 so as to form a circle.

The gas turbine 22 comprises a respective wall structure 13 surrounding the combustion chamber 19 and the turbine section 17. The respective wall structure 13 comprises second components 3 which—with respect to the combustion chamber 19—are shown in more detail in FIG. 2. Surrounded by and attached to the wall structure 13 first components 2 are exposed to the flow of the hot gas 24. A cooling gas region 28 is formed between the first components 2, for example a guide-blade plate 12 or a heat shield element of the combustion chamber 19 and the components 3 of the turbine wall structure 13. Cooling gas 25 is fed through cooling gas supply lines 30 in the respective cooling gas region 28.

The guide blades 16 are each connected to the wall structure 13 in the turbine section 17 through a guide blade plate 12, which represents a first component 2. A guide blade plate 12 is also referred to as shroud or the sealing strip on turbine blades. Its purpose is to supply rigidity to the blades, lessen vibration and provide to some extend a sealing between stages.

Adjacent guide blades 16 are spaced apart from one another along the circumference so that they can essentially freely expand thermally. The guide-blade plate 12 separates the hot-gas region 11 formed around the main axis 14 of the gas turbine 22 from a cooling gas region 28 formed between the guide-blade plate 12 and the components 3 of the turbine wall structure 13. The moving blades 15 extend radially outward perpendicular to the main axis 14. The moving blades 15 lie completely within the hot-gas region 11. This hot-gas region 11 is separated from the cooling-air region 28 by a plurality of first components 2, also called as components of a seal ring, along the circumference of the gas turbine 22. The components 2 are each adjacent to the moving blades 15. For the sake of clarity, only one guide blade 16, one moving blade 15 and one component 2 of the seal ring is shown for each turbine stage. A respective component 2 and guide-blade plate 12 is spaced apart from a respective component 3 of the wall structure 13 in the radial direction (direction perpendicular to the main axis 14) through a gas-leakage gap 5 (see FIG. 2).

This gap 5 is sealed off by a seal element 1, thereby largely preventing a flow of cooling gas 25 out of the cooling-gas region 28 into the hot-gas region 11 and preventing hot gas 24 from flowing through the gap 5 in the cooling gas region 28.

Figure 2:
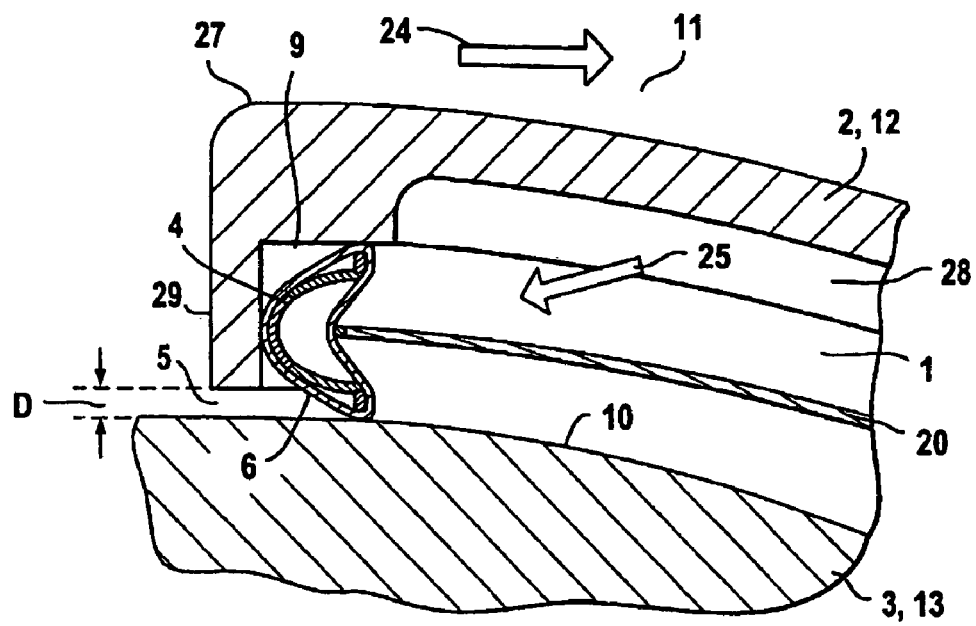
FIG. 2 is an enlarged, fragmentary, cross-sectional view of a seal element in a combustion turbine.

FIG. 2 shows an enlarged cross-sectional view of a portion of a combustion chamber 19 like the one shown in FIG. 1. A seal element 1 is positioned between a first component 2, which is a heat shield element of the combustion chamber 19, and a second component 3, which is part of a wall structure 13 surrounding the combustion chamber 19. The heat shield element 2 has a side wall 29 directed towards a second surface 10 (also called an outer surface 10) of the wall structure 13. Between the side wall 29 and the wall structure 13 a gas-leakage gap 5 having a width D remains. The heat shield element 2 has a first surface 9 (also called an inner surface 9) directed to the wall structure 13 and a hot gas surface 27, which is opposite to the inner surface 9 and is exposed to a flow of hot exhaust gas 24. The inner surface 9 as well as outer surface 10 of the wall structure 13 may be curved, may change their shape (deform) while being exposed to a high temperature or may have steps or the like. Between the heat shield element 2 and the wall component 3, in particular between the inner surface 9 and the outer surface 10 a seal element 1 is positioned. In a cross-sectional view (see FIG. 4) the seal element 1 has an arc-like shape with contacting members 8 at the end of each side of the arc expanding almost perpendicular away from the ends of the arc. In a longitudinal direction the seal element 1 is curved along a centre line 26, which almost describes a circle. The seal element 1 is completely surrounded by a sealing structure 6 in form of a sleeving web made of fibres. Those fibres consist either of ceramic materials or of a heat resistant metal. So to some extend, depending on the mesh-size of the web the sleeving 6 the seal-element 1 is gas pervious. The sleeving 6 is tightened by a tightening member 20 so that its surface is in close contact with the outer surface 10 and the inner surface 9 for sealing the gap 5.

The sealing structure 4 is generally gas impervious and has a frame portion 7, which is slightly curved in a cross-section and ring-like curved along the centre line 26. It consists of a metal strip formed from a sheet metal. The metal chosen for the support structure 4 is preferably a heat resisting steel or a high temperature NiCr alloy. The width of the support structure 4 is greater than the width D of the gap 5. The support structure 4 gives the seal element 1 a good mechanical stiffness and elasticity, so that it also withstands high-pressure loads and the risk of breaking into parts and falling through the gap is avoided. The support structure 4 is covered on all sides by the sleeving 6, in particular of ceramic fibres. The sleeving 6 of fibres defines a flexible and deformable sealing surface. The fibres consist preferably of a mixture of silica $SiO_2$ and alumina $Al_2O_3$, for example (in weight %) of 73% $Al_2O_3$ and 27% $SiO_2$ with $\gamma$-$Al_2O_3$ and amorphous $SiO_2$.

Between component 2 and component 3 a cooling gas region 28 is defined to which cooling gas 25 is supplied. The pressure of the cooling gas 25 is higher than the pressure of the hot gas 24, which flows through the turbine 22 in the hot gas flow region 11. Therefore a pressure difference exists which causes the seal element 1 to some extend to be pressed by the cooling gas 25 on the side wall 29 close to the gas-leakage gap 5. As the sealing structure 6 is to some extend gas pervious the cooling gas 25 flows through the sleeving 6 thereby cooling the fibres. This leads to an effusion cooling of the seal element 1. So also regions and turbine parts in the vicinity of the gap 5 outside of the cooling gas region 28 can be cooled. As the seal element 1 is capable to cope with deformations of the inner surface 9 and the outer surface 10 as well as radial and axial movements of the surfaces 9,10 an effective sealing of the gas-leakage gap 5 is assured and the amount of cooling fluid 25 needed is reduced. The cooling gas 25 saved in this way is now available for the combustion process.

Figure 3:
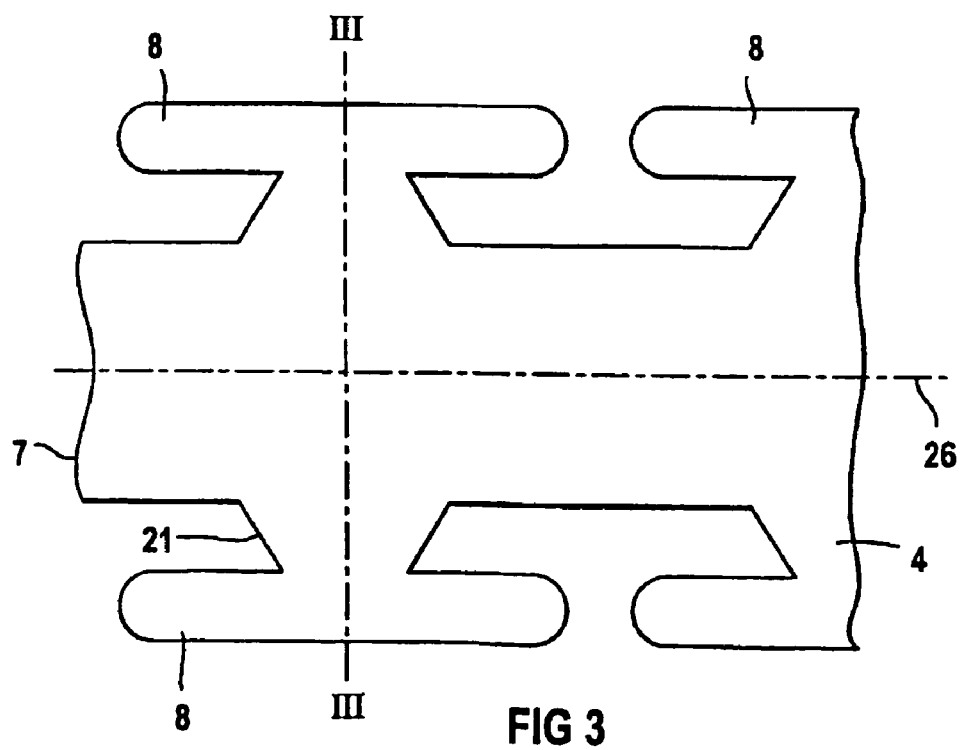
FIG. 3 is a fragmentary plan view of a sealing structure of a seal element.

FIG. 3 shows a plan view of a portion of the support structure 4 of the seal element 1 according to FIG. 2 along the centre line 26. The support structure 4 has a frame portion 7, whereby on both sides of the centre line 26 contacting members 8 are connected to the frame portion 7 through a respective branch portion 21. So the contacting members 8 are connected to the frame portion 7 like vats. The support structure 4 with all its portions, frame portion 7, contacting members 8 and branch portion 21 can be manufacture from one single metal sheet. The support structure 4 with a number of vat-like contacting members 8, which together with the branch portions 21 are elastically deformable to follow movements or deformations of the first and second components 2,3, allow an efficient sealing of the gap 5.

Figure 4:
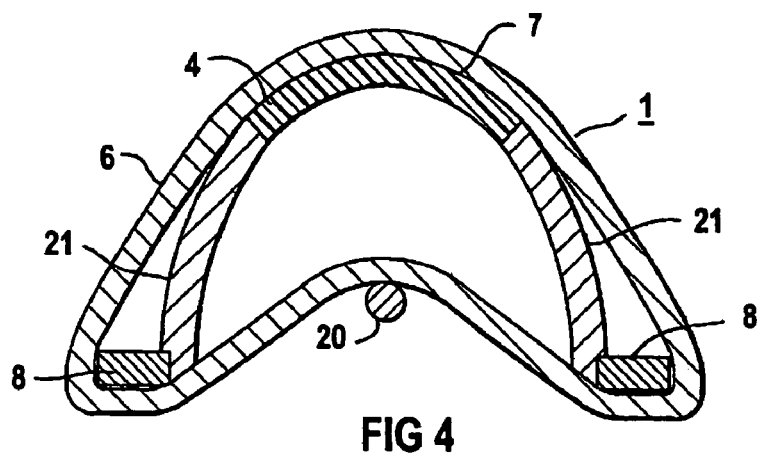
FIG. 4. is a cross-sectional view of a seal element along line III—III of FIG. 3.

In FIG. 4 a cross-sectional view of a seal element 1 along line III—III of FIG. 3 is shown. In this cross-sectional view the seal element 1 has a support structure 4 with a U-like shape, whereby the frame portion 7 forms the bottom of the U and the branch portions 21 form the sides of the U. At the end of each branch portion 21 a contacting member 8 extends perpendicular outwardly away from the branch portion 21. The support structure 4 is completely surrounded by the sealing structure 6. The sealing structure 6 is tightened by a tightening member 20, which pushes the web of the sealing structure 4 into the U-shaped support structure 4. So the web of the sealing structure 4 is tightened between two adjacent contacting members 8 along the centre line 26 and on the outer side of the support structure 4 between frame portion 7 and contacting members 8.

Figure 5:
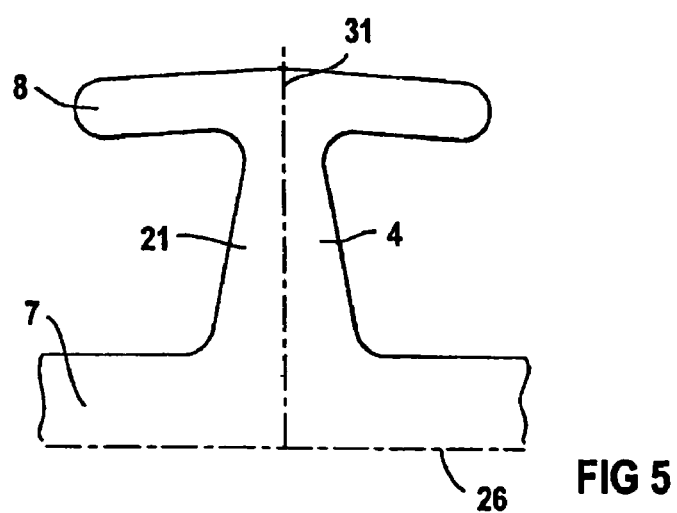
FIG. 5 is fragmentary winding off view of a sealing structure along line III—III of FIG. 3.

In FIG. 5 a fragmentary winding off view of the sealing structure 4 along line III—III of FIG. 3 is shown. The vat-like contacting member 8 is connected to the frame portion 7 by the branch portion 21. The branch portion 21 extends along a branch centre line 31, to which it is symmetric. Both contacting member 8 and branch portion 21 are made of an elastically deformable material, in particular a metal. As the contacting member 8 is connected to the branch portion 21 only in the vicinity of the branch centre line 31 it has two arms, which can deform independently from the branch portion 21. Furthermore the branch portion 21 itself can deform, in particular in a direction perpendicular to the connecting member 8. So the sealing structure 4 can compensate any movement or deformation of the surfaces 9, 10 with the contacting members 8 remaining in contact with the surfaces 9,10.

Figure 6:
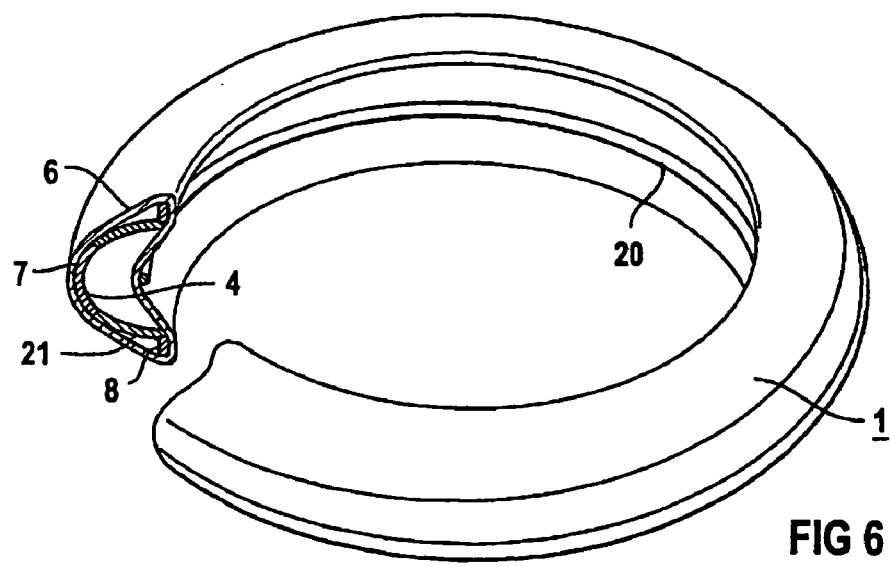
FIG. 6 is a perspective view of a ring shaped seal element.

FIG. 6 shows a perspective view of a ring shaped seal element 1 with a sealing structure 4 having a frame portion 7, branch portions 21 and contacting members 8. The sealing structure 4 is introduced in a sleeving 6 made of heat resisting fibre web. A spring ring 20 is provided in the inner circle of the ring like seal element 1 pushing the sleeving 6 into the support structure 4 for tightening the sleeving 6.

Figure 7:
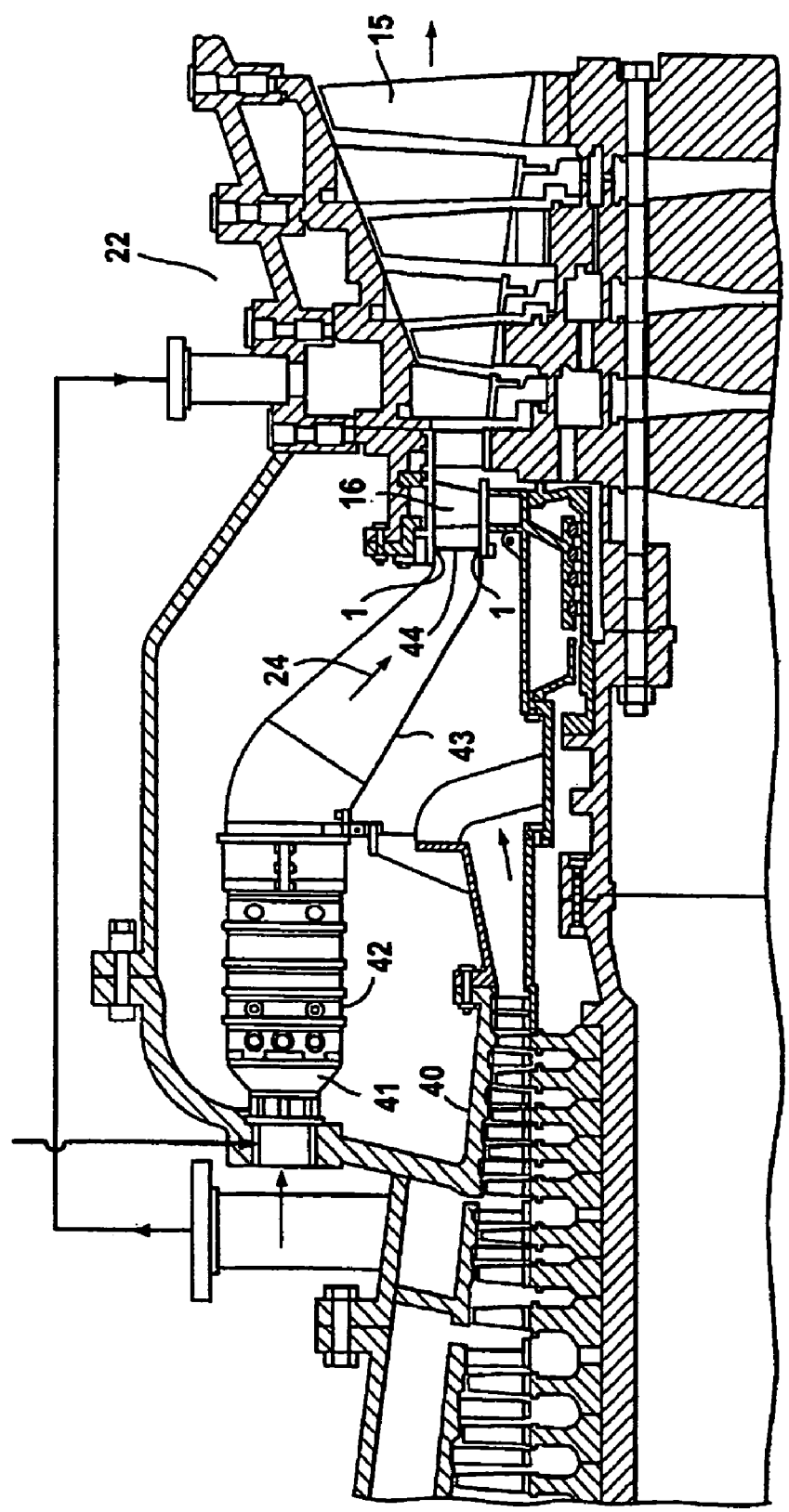
FIG. 7 is a fragmentary, diagrammatic, longitudinal-sectional view of a combustion turbine.
Figure 8:
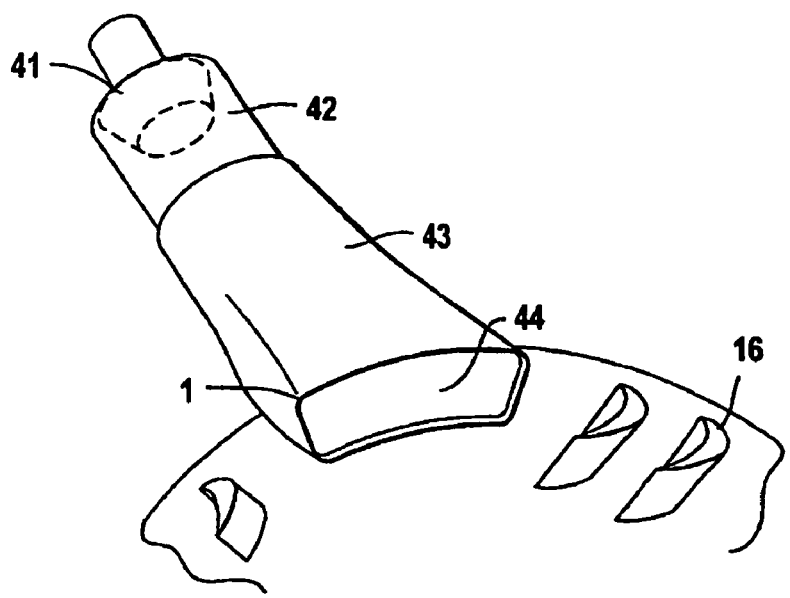
FIG. 8 is a perspective view of the burner section of the combustion turbine of FIG. 7.
Figure 9:
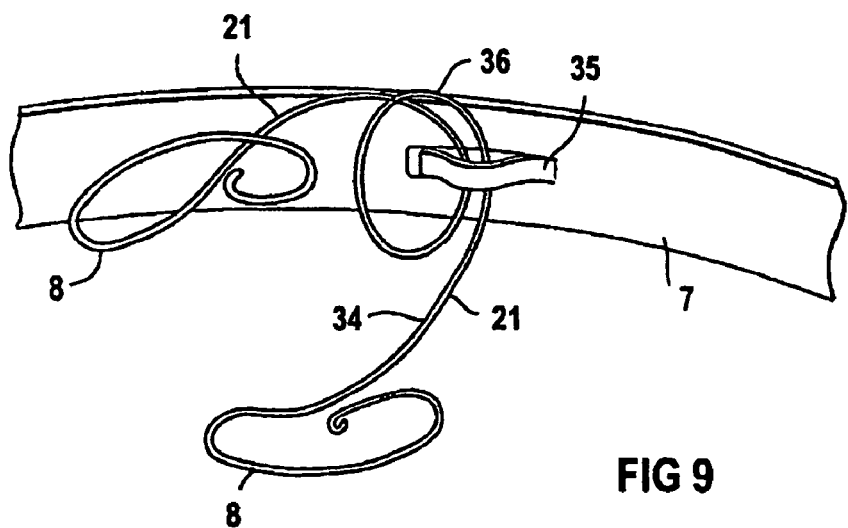
FIG. 9 is a perspective view of a support structure of a seal element.
Figure 10:
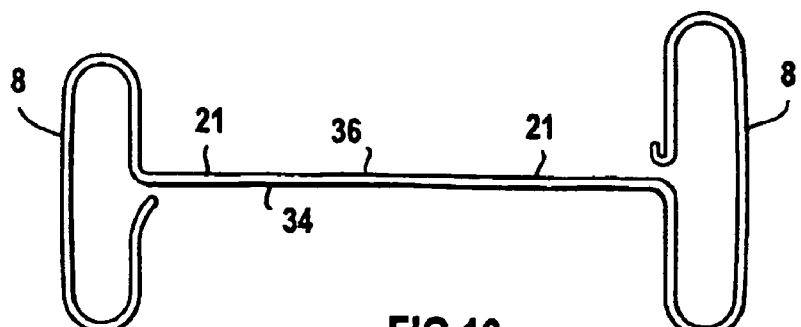
FIG. 10 is a winding off view of the support structure of FIG. 9.

FIG. 7 is a cross-sectional view of a portion of a gas turbine 22 having a number of separate burners 41, examples of this kind of turbine are described in U.S. Pat. No. 5,566,42 and U.S. Pat. No. 5,623,819. As can be seen, the gas turbine 22 has a compressor 40 for producing compressed air. The compressed air discharged from the compressor 40 is directed into the burner 41, which is situated in a basket 42 (also called combustors) (only one of which is shown in FIG. 7). The compressed air is heated by the combustion of fuel to generate a hot gas 24. From the combustors 42, the hot gas 24 is directed by ducts 43(also called cans) to a turbine section 17. Within the turbine section 17 the hot gas 24 flows over alternating rows of stationary vanes 16 and rotating blades 15. The turbine section 17 has a number of turbine inlets 44, each of which is assigned to one respective duct 43. The duct 43 ends in the vicinity of the turbine inlet 44 (see FIG. 8 which provides a perspective view of this). The arrangement of duct 43 and turbine inlet 44 is sealed of by a seal element 1, which has the shape of a loop, in particular a almost rectangular loop following the shape of the turbine inlet. FIG. 9 shows a perspective partial view of a support structure 4 of a seal element 1. The support structure 4 has a frame portion 7, in particular a metal strip or the like. The frame portion 7 has a fastening hook 35 forming an opening through which a two-arm spring 34 is fastened to the frame portion 7. The two-arm spring 34 is made of a suitable metallic wire and has a middle portion 36, which forms a loop wound through the fastening hook 35. The middle portion 36 connects two arms of the spring 34, which form elastically deferrable branch portions 21 of the seal element 1. At the outer end of each branch portions 21 the spring 36 is bent to form contacting members 8 extending perpendicular to the branch portions 21. FIG. 10 shows a winding off view of the spring 34 of the support structure 4, with the contacting members 8 forming an almost oval portion with a long straight, which long straight serves for contacting the sealing structure 6 to a respective of the surfaces 9,10 (see for example FIG. 2).

The invention claimed is:

1. A seal element for sealing a gap between a first component and a second component spaced apart from each other, the first component having a first surface and the second component having an opposing second surface, the seal element comprising:

a support structure having at least two contacting members; and a sealing structure comprising a fibrous web and covering at least partially the support structure, wherein each contacting member serves for putting a portion of the sealing structure in contact with one of the surfaces and being capable of following a deformation and/or movement of said surface and wherein the support structure has a frame portion to which the contacting members is connected via a branch portion extending away from the frame portion.

2. A seal element for sealing a gap between a first component and a second component spaced apart from each other, the first component having a first surface and the second component having an opposing second surface, the seal element comprising:

a support structure having at least two contacting members; and a sealing structure covering at least partially the support structure, wherein each contacting member serves for putting a portion of the sealing structure in contact with one of the surfaces and being capable of following a deformation and/or movement of said surface and wherein the support structure has a frame portion to which the contacting members is connected via a branch portion extending away from the frame portion, wherein the sealing structure comprises a web having metallic and/or ceramic fibres.

3. The seal element according to claim 2, wherein the sealing structure comprises a ceramic fibre fabric, a ceramic fibre tape, a ceramic fibre sleeving or a ceramic fibre mat.

4. The seal element according to claim 2, wherein the sealing structure comprises ceramic fibres consisting of ZrO2, SiO2 and/or Al2O3.

5. The seal element according to claim 2, wherein the sealing structure comprises a metallic fibre fabric, a metallic fibre tape, a metallic fibre sleeving or a metallic fibre mat.

6. The seal element according to claim 2, wherein the sealing structure comprises metallic fibres consisting of a superalioy, in particular a nickel-based, a cobalt-based or ironbased superalloy.

7. The seal element according to claim 2, wherein the sealing structure is loosely connected to said support structure.

8. The seal element according to claim 2, wherein the support structure consists of a metal, in particular a sheet metal.

9. The seal element according to claim 2, wherein the support structure baa a curved form, in particular is U-shaped, open-ring shaped or ring-shaped.

10. The seal element according to claim 2, wherein the branch portion and the contacting member are elastically deformable.

11. The seal element according to claim 2, wherein the support structure has at least two branch portions with different length.

12. The seal element according to claim 11, wherein the branch portions form together with a middle portion a two-arm spring, which spring is fastened to said frame portion at said middle portion.

13. The seal element according to claim 2, further comprising a tightening member for tightening said sealing structure between two adjacent contacting members.

14. The seal element according to claim 13, wherein said tightening member comprises a spring member.

15. The seal element according to claim 2 for the use in a hot gas chamber having a hot-gas flow region, the hot gas chamber comprising:

a wall structure surrounding the hot-gas flow region and comprising the second component having the second surface, the first component being attached to said wall structure and having the first surface, which is directed to the wall structure, wherein the gap is formed between the first component and the second component, the sealing structure being in contact with the second surface of the second component and with the first surface of the first component thereby sealing the gap.

16. The seal element according to claim 15, wherein the hot gas chamber is a part of a combustion turbine.

17. The seal element according to claim 15, wherein the first component is a heat shield element of a combustion chamber or a shroud element of a turbine section.

18. The seal element according to claim 2 for the use in a combustion turbine, the combustion turbine comprising:

a burner;

a turbine section having a turbine inlet for hot gas to enter the turbine section; and a duct connecting the burner to the turbine section for hot gas to flow from said burner to said turbine section, whereby the first surface is foimed by the turbine inlet and the second surface by the duct in the vicinity of the turbine inlet, with the gap between the first surface and the second surface sealed by the seal element.

19. A combustion turbine, comprising:

a hot gas chamber having a hot-gas flow region;

a wall structure surrounding the hot-gas flow region and comprising at least one second component having a second surface directed to the hot-gas flow region;

at least one first component being attached to the wall structure and having a first surface, which is directed to the wall structure;

a gap formed between the first component and the second component;

a seal element for sealing said gap the seal element comprising:

a support structure;

a sealing structure, wherein the sealing structure is a fibrous sleeve, covering at least partially the support structure, wherein the support structure comprises at least two contacting members, each contacting member puts a portion of the sealing structure in contact with one of the surfaces and being capable of following a deformation of the surface, wherein the support structure has a frame portion to which the contacting members is connected via a branch portion extending away from said frame portion.

20. The combustion turbine according to claim 19, wherein the seal element comprises a curved frame portion from which the contacting members are spaced apart and each contacting member being connected to the frame portion via a branch portion.

21. A combustion turbine, comprising:

a hot gas chamber having a hot-gas flow region;

a wall structure surrounding the hot-gas flow region and comprising at least one second component having a second surface directed to the hot-gas flow region;

at least one first component being attached to the wall structure and having a first surface, which is directed to the wall structure;

a gap formed between the first component and the second component;

a seal element for sealing said gap the seal element comprising:

a support structure; and a sealing structure at least partially covering the support structure, wherein the support structure comprises at least two contacting members, each contacting member puts a portion of the sealing structure in contact with one of the surfaces and being capable of following a deformation of the surface, wherein the support structure has a frame portion to which the contacting members is connected via a branch portion extending away from said frame portion, wherein the sealing structure comprises a fibrous sleeving at least partially surrounding the support structure.

22. A seal element for sealing a gap between a first component and a second component, the first component having a first surface and the second component having a second surface separated from the first surface by the gap, the seal element comprising:

a fibrous sealing element;

a support element providing mechanical support for the fibrous sealing element across the gap between a hot gas flow region on a first side of the gap and a cooling gas region on a second side of the gap;

wherein a gas pervious property of the fibrous sealing element provides a degree of effusion cooling of the sealing element by a flow of cooling gas from the cooling gas region across the fibrous sealing element.

23. The seal element of claim 22, further comprising a tightening member urging the sealing element into close contact with the first surface and the second surface.

24. The seal element of claim 22, wherein the support element comprises a means for elastically deforming to accommodate relative movement between the first and second components.

* * * * *